McAFEE & WIRT.
Clod-Crusher.
No. 57,939.
Patented Sept 11. 1866
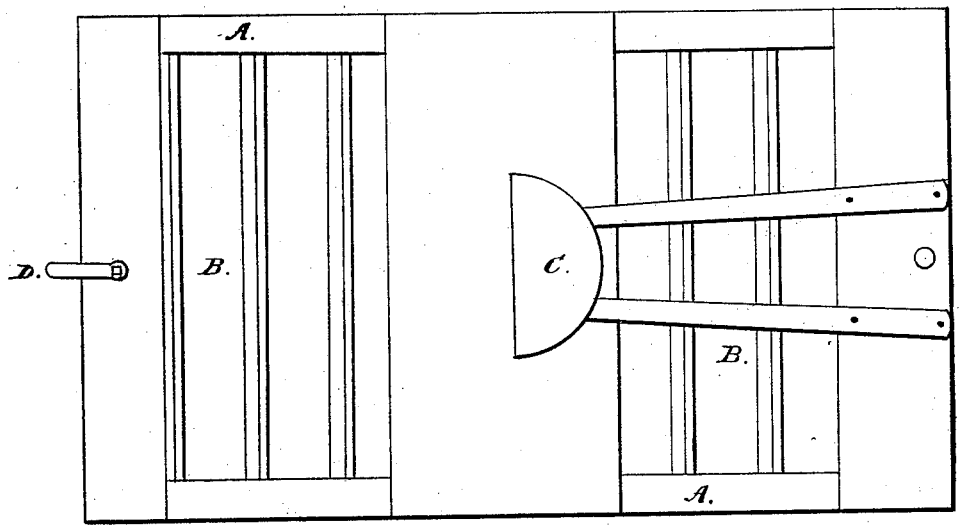
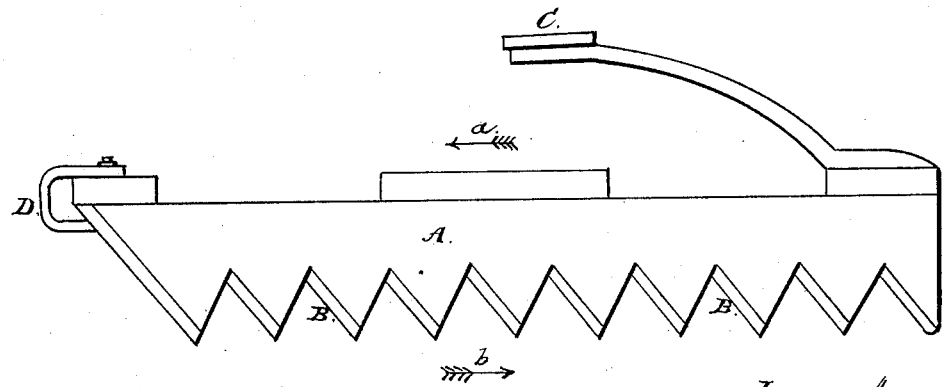

UNITED STATES PATENT OFFICE.

B. J. McAFEE AND J. H. WIRT, OF DELPHI, INDIANA.

IMPROVEMENT IN GROUND-DRAGS.

Specification forming part of Letters Patent No. 57,939, dated September 11, 1866.

*To all whom it may concern:*

Be it known that we, B. J. MCAFEE and J. H. WIRT, of Delphi, in the county of Carroll and State of Indiana, have invented certain new and useful Improvements in Ground-Drags and Pulverizers; and we do hereby declare that the following is a full and complete description thereof, reference being had to the accompanying drawings, making a part of this specification, in which—

Figure 1 is a top view of the drag. Fig. 2 is a side view of the same.

Like letters of reference refer to like parts in the different views.

The drag is of rectangular form, and consists of the two side pieces, A A. These side pieces are so cut out or notched as to admit of the cross-bars B B being attached to the sides at an angle of about fifty degrees, the said cross-bars being parallel to each other and allowing a space between them, as indicated by c in the views.

C represents the seat for the driver; D, the clevis by which the drag is attached to the team, and can be fastened to either end of the drag, which can be drawn in the direction indicated by the arrow a, or that shown by the arrow b. When drawn as indicated by the arrow a, it serves to level down and smooth the ground. When drawn in that shown by b, it acts as a distributer and spreader of fertilizers, spreading them evenly over the surface of the ground. It also acts as a pulverizer in crushing and pulverizing the ground.

What we claim as our invention, and desire to secure by Letters Patent, is—

The sides A, in combination with the cross-bars B, when constructed and arranged, in relation to each other, in the manner and for the purpose set forth.

B. J. McAFEE.
J. H. WIRT.

Witnesses:
J. M. GRANT,
JAMES McCLAIN.